Nov. 24, 1970     J. H. STOVER III     3,541,844

FORCE-MEASURING WASHER AND READOUT ARRANGEMENT

Filed May 7, 1969     2 Sheets-Sheet 1

INVENTOR.
JORDAN H. STOVER, III

BY

Davis, Hoxie, Faithfull & Hapgood
ATTORNEYS

INVENTOR.
JORDAN H. STOVER, III

United States Patent Office 3,541,844
Patented Nov. 24, 1970

3,541,844
FORCE-MEASURING WASHER AND READOUT ARRANGEMENT
Jordan H. Stover III, Tucson, Ariz., assignor to Lebow Associates, Inc., Troy, Mich., a corporation of Michigan
Continuation-in-part of application Ser. No. 769,768, Aug. 1, 1968. This application May 7, 1969, Ser. No. 822,638
Int. Cl. G01l 1/22
U.S. Cl. 73—88.5        3 Claims

ABSTRACT OF THE DISCLOSURE

An improved force-measuring washer and readout circuit arrangement therefor employs two wire leads to connect strain gauges mounted on the washer to an impedance bridge configuration, and a separate lead directly connecting one terminal of the strain gauges to an output signal amplifier. The wires connecting the strain gauges into the bridge are thereby electrically included in different, adjacent bridge branches such that spurious signals associated with these leads are mutually subtractive rather than cumulative in effect.

---

This invention relates to electronic test equipment and, more specifically, to improved force-measuring washer and readout apparatus.

This application is a continuation-in-part of my copending application Ser. No. 769,768 filed Aug. 1, 1968, now Pat. No. 3,461,715 issued Aug. 19, 1969 which, in turn is a continuation-in-part of my application Ser. No. 505,912 filed Nov. 1, 1965, now abandoned.

Transducer constructions for providing a characteristic electrical impedance, e.g., resistance which varies with a particular environmental or physical condition such as temperature, pressure or the like, are well known. Perhaps the most prevalent way to determine the instantaneous value of the particular parameter being sensed is to connect the transducer in a Wheatstone bridge configuration as shown, for example, in FIG. 1. The bridge includes four nodes, 10, 20, 30 and 40 with resistor $R_1$, $R_2$, $R_3$ and $R_4$, each being connected between a different pair of nodes. The element $R_4$ comprises the variable transducer resistance which is connected by two transducer leads 15 and 16 to the nodes 30 and 40.

A bridge energizing voltage source 25 is applied between a pair of diagonally opposite pair of bridge nodes, e.g., the nodes 10 and 40. After the bridge has been balanced, the voltage differences $E_0$ between the other diagonally opposite bridge nodes, i.e., between the nodes 20 and 30, supplies a direct measure of the environmental or physical condition under study.

However, the transducer $R_4$ is often located a significant distance away from the remainder of the composite bridge circuit, and thus the leads 15 and 16 are often relatively long. The resistance of these leads is subject to change, e.g., because of temperature effects. The amount of this change in resistance bears a direct relationship to the length of the leads 15 and 16.

Thus, since both of the leads 15 and 16 are in the same bridge branch 30–40, the resistance changes in the leads 15 and 16 are additive and distort the true condition of the bridge, thereby introducing an error component in the parameter defining output voltage $E_0$.

It is therefore an object of the present invention to provide an improved force-measuring washer and readout arrangement for determining the value of a compression force.

More specifically, an object of the present invention is the provision of an improved force-measuring washer and readout instrument arrangement which reduces or eliminates the spurious effects associated with the relatively long lead lengths required when the washer is remotely disposed from the remainder of the bridge.

These and other objects of the present invention are realized in a specific illustrative force-measuring washer and readout arrangement wherein at least one strain gauge on the washer and three additional branch resistors are connected in a bridge array. A voltage source is connected to a first pair of diagonally opposite bridge nodes.

The strain gauge is adapted to include a second lead on one of its terminals, remotely disposed from the connection to the bridge energizing source, which is connected to the input of a difference amplifier exhibiting a high input impedance. The remaining bridge node between the fixed branch resistors is also connected to the difference amplifier which develops a meter driving output signal depending in amplitude upon the difference between the two input signals supplied thereto.

The output signal conveying strain gauge lead has the electrical effect of rendering one terminal of the transducer as an effective bridge node, thereby placing one of the two leads connecting the transducer to the bridge into each of two adjacent bridge branches. Depending upon the values for the branch resistors vis-a-vis the nominal strain gauge impedance, any spurious electrical signals developed across the transducer leads will be principally or totally excluded from the bridge output signal votage.

A complete understanding of the present invention and of the above and other features, advantages and variations thereof may be gained from a consideration of the following detailed description of an illustrative embodiment thereof presented herein below in conjunction with the accompanying drawing in which.

Figure 2:
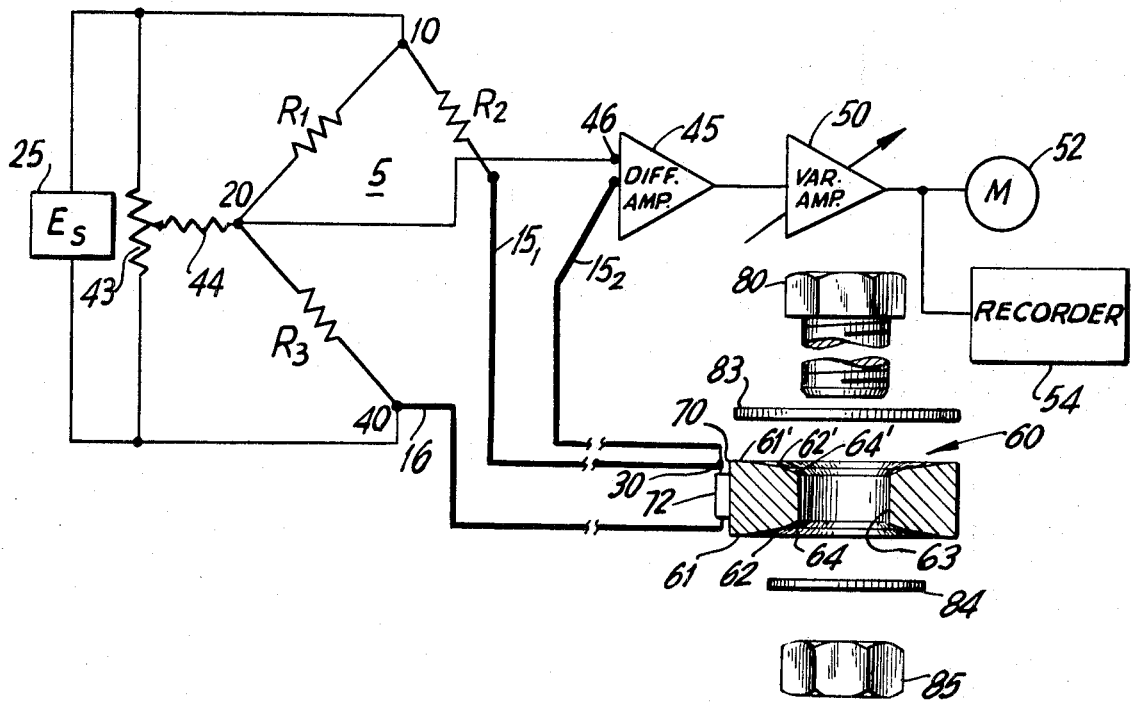
FIG. 2 is a schematic diagram of a force-measuring washer and quarter-bridge readout circuit configuration embodying the principles of the present invention.

Referring now to FIG. 2, there is shown a bridge configuration 5 including bridge nodes 10, 20 and 40, with fixed bridge branch resistors $R_1$, $R_2$, and $R_3$ being connected to and/or between these nodes as shown.

The fourth bridge branch comprises at least one strain gauge 72 mounted on the periphery 70 of force-measuring stress washer 60 described in detail in my aforementioned copending application Ser. No. 769,768. In brief, the washer 60 is of a standard annular disc design, but is countersunk over approximately two-thirds of its face area. Each of the flat portions 61 and 61' of the washer is shown as constituting about 30 to 40% of the total horizontal cross-sectional area of the washer, but it may constitute as much as 60% or more. This special design causes compressive forces on the washer to be borne entirely by the two annular flat portions 61 and 61' and therefore permits accurate measurement of the compressive strain on the washer by one or more strain gauges 72 on the washer periphery 70. This design also permits more accurate measurement of the compressive strain since the strain is proportionately greater on the reduced area than for a completely flat washer.

The force-measuring washer 60 (in addition to having a hole slightly larger than the diameter of the bolt about which its use is intended and a major diameter equal to the width across flats of the bolt head or nut under which it is intended for use) has countersunk surfaces 62, 62′ and further countersinks 64, 64' for purposes discussed in my said copending application.

The single strain gauge 72 on the washer periphery 70 (or a plurality of strain gauges so located and electrically connected in series to raise the output signal amplitude and characteristic impedance) has two leads $15_1$ and $15_2$ connected to one terminal thereof, and a single lead 16 connected to the other gauge terminal. The strain gauge impedance between the leads $15_1$ and $15_2$ and the lead 16 is dependent upon the compressive stress applied to the washer 60, e.g., a function of the force between bolt 80 and upper washer 82, and lower washer 84 and nut 85 in FIG. 2.

One terminal of the strain gauge 72 is connected by the lead 16 to the bridge node 40. The other strain gauge terminal is connected by the lead $15_1$ to the resistor $R_2$ and also connected by the lead $15_2$ to one input terminal 47 of a difference amplifier 45. The leads $15_1$, $15_2$ and 16 are of a substantively like length, each covering the distance between the force-measuring washer 60, wherever located, and the remainder of the readout apparatus which may be included in a unitary instrument cabinet located feet, yards, or miles away.

A bridge energizing voltage source 25 is connected to the bridge nodes 10 and 40, and the node 20 is connected to a second input terminal 46 on the difference amplifier 45. The difference amplifier 45 is adapted to supply an output signal to a variable gain amplifier 50 which bears a fixed multiplication factor relationship to the difference in the potentials supplied to the input terminals 46 and 47. The output from the variable gain amplifier 50, which is a direct measure of the compressive stress being sensed by the washer 60, is supplied to a meter 52 for direct display, and to a recorder 54 to develop a record over a prolonged time period. The scale of the meter 52 and the graphs for the recorder 54 are preferably calibrated directly in stress units, thereby providing for instantaneous compressive stress determination without data conversion.

Finally the arrangement includes a zero adjustment potentiometer 43 connected in parallel with the voltage source 25, with a tap of the potentiometer 43 being connected to the bridge node 20 via a series current limiting resistor 44.

The nominal values of the resistance elements $R_1$, $R_2$, $R_3$ and the strain gauge 72 are chosen such that the bridge is balanced (zero output signal) at some nominal or base stress condition for the gauge 72. The tap of the potentiometer 43 is adjusted to provide an exact zero adjustment for the base condition of the strain gauge 72 to correct for any departure from the balance.

It is observed that a requisite fourth bridge node 30 for the FIG. 2 arrangement is located at the junction of the leads $15_1$ and $15_2$ at one terminal of the strain gauge 72. This advantageous location for the node 30 is dictated by the circuit connections to the difference amplifier 45 which measures, and is responsive to the difference between the voltages at the node 20 and at the terminal of the strain gauge 72 designated as node 30. Thus, the transducer leads $15_1$ and 16 connecting the strain gauge 72 into the bridge 5 are respectively included in the bridge branches 10–30 and 30–40. This is contrasted with the prior art bridge arrangement of FIG. 1 wherein both transducer leads are included in the same branch 30–40. The improved electrical effects derived from this shifting of the lead $15_1$ into the bridge branch 10–30 in FIG. 2 will be considered hereinbelow.

With the above structure in mind, the functional operation of the FIG. 2 circuit arrangment will now be examined. The force washer 60 is first exposed to a base or reference stress condition, and the potentiometer 43 adjusted such that there is zero output from the amplifiers 45 and 50, as observed on the meter 52. The strain gauge 72 is then subjected to a known stress condition which differs from the base condition, and the gain of the amplifier 50 adjusted to yield the proper meter reading of that value. This adjustment (gain setting) of the amplifier 50 then becomes the gauge factor used whenever the particular force washer 60 is read (there may be many such units selectively connected for reading into the arrangement of FIG. 2). The force-measuring washer 60 is then placed into service to measure a particular compressive stress of interest.

The voltage source 25 supplies currents through the bridge circuit paths 10–20–40 and 10–30–40, with these currents developing voltages at the bridge nodes 20 and 30. As the stress applied to the washer 60 changes, the resistance of the gauge 72 changes in a corresponding manner. This unbalances the bridge, thereby producing a difference in voltage between the nodes 20 and 30. This difference in voltage is amplified by the circuit members 45 and 50 and is displayed as a measure of compressive stress by the meter 52 and the recorder 54.

Figure 1:
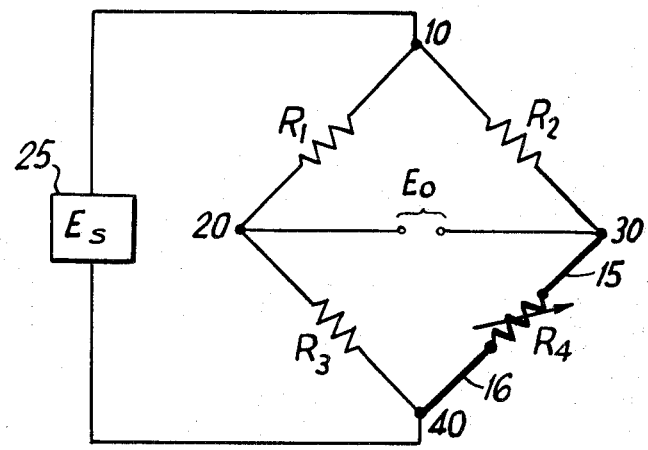
FIG. 1 is a schematic diagram of a prior art bridge circuit as above-discussed.

The above described mode of operation for displaying the stress values sensed by the strain gauge 72 proceeds in a manner directly analogous to that of the prior art arrangement of FIG. 1. As shown by the following, however, and unlike the prior art apparatus, the circuit arrangement of FIG. 2 will reduce or eliminate inaccuracies caused by problems associated with the leads $15_1$ or 16 which may be quite long. Assume, for example, that the resistance of both of these leads changes, as by exposure to a condition of varying temperature. The lead 16 interjects the resistance change into the bridge branch 30–40, and the lead $15_1$ introduces a corresponding resistance change into the bridge branch 10–30. These two like resistance changes act against one another and thus produce at most only a small change in voltage at the bridge output node 30. This reduced error output voltage component produced by the opposing signals spuriously developed across the leads $15_1$ and 16 in FIG. 2 is always much smaller than the output error signal developed in the prior art bridge of FIG. 1 wherein the two individual error sigals are additive. Moreover, if all four resistances $R_1$–$R_3$ and the strain gauge 72 are made equal or substantially equal (a bridge balanced condition—see the above equation), the equal changes produced by the leads $15_1$ and 16 will exactly cancel and produce no error signal component.

It is observed that the measuring circuit arrangement is essentially insensitive to the impedance of the lead $15_2$ connecting the effective bridge node 30 to the difference amplifier 45, and thereby also insensitive to any changes in impedance of this lead. The high input impedance of the difference amplifier 45 will completely swamp out and mask any impedance factor associated with the lead $15_2$. Thus the amplifier 45 properly produces an amplified replica of the actual voltage difference exhibited at the physical bridge nodes 20 and 30.

Thus the arrangement of FIG. 2 has been shown by the above to accurately readout and display the stress sensed by the strain gauge 72 while being relatively or totally insensitive to problems associated with the leads connecting the transducer to the readout instrument.

Figure 3:
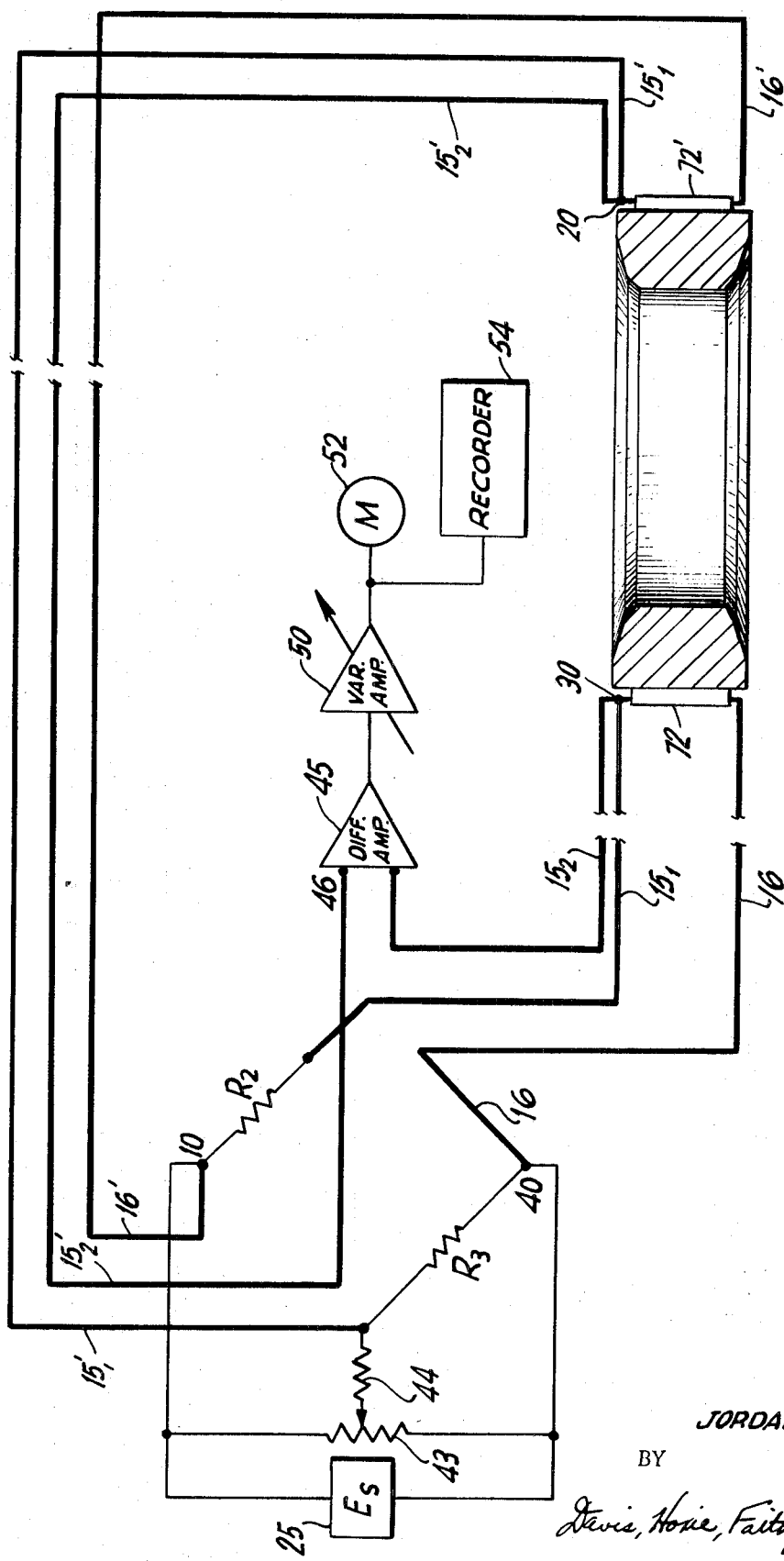
FIG. 3 depicts a force-measuring washer and half-bridge readout circuit made in accordance with the principles of the present invention.

The readout instrument of FIG. 2 is of the quarter bridge type, i. e., has a signal injected in one bridge branch only. The principles of the present invention are equally applicable to a half bridge arrangement, shown in FIG. 3, wherein two strain gauges 72 and 72' (or two strain gauge series combination) on the stress washer 60 are respectively connected by the leads $15_1$, $15_2$, 16 and $15_1'$, $15_2'$ and 16' to opposite bridge branches and to the inputs 46 and 47 of the difference amplifier 45. For this half bridge configuration, the stress information signal output from the washer 60 is effectively doubled since the voltage changes at the nodes 20 and 30 are of an opposite polarity for any change in applied stress. Thus the sensitivity and signal-to-noise ratio of the readout apparatus is improved for the half bridge arrangement.

It is to be understood that the above-described arrangement is only illustrative of the application of the principles of the present invention. Numerous other arrangements may be devised by those skilled in the art without departing from the principles of the present invention. For example, a double pole, double throw switch can be employed to reverse the connections from the bridge nodes 20 and 30 to the amplifier input terminals 46 and 47. This is required for a direct current energized bridge where the amplifier 45 can amplify a difference signal of only one polarity, and where the impedance of the strain gauge 72 can vary in both directions from its nominal or base value. This variation arises, for example, when the stress washer 60 is used to monitor both tensional and compressive stresses.

What is claimed is:

1. In combination, a force-measuring washer including at least one peripheral strain gauge forming a variable impedance, said strain gauge having two terminals, first, second and third bridge branch resistance means, a first lead connecting one terminal of said washer peripheral strain gauge to said first branch resistance means, a second lead connecting the other terminal of said strain gauge to said second branch resistance means, said third branch resistance means connecting said first and second branch resistance means to form a circuit path including said strain gauge and said first, second and third branch resistance means, voltage supplying means connected to the junction of said second and third branch resistance means and to the junction of said first branch resistance means and said first lead, output difference sensing means including first and second input terminals, said first input terminal of said sensing means being connected to the junction of said first and third branch resistance means, a third lead connecting said other terminal of said strain gauge with said second input terminal of said output sensing means, wherein said third bridge branch resistance means includes at least one additional strain gauge included on the periphery of said force washer, said additional strain gauge including two additional strain gauge and fifth leads connecting said additional strain gauge terminals to said first and second resistance means respectively, and a sixth lead connecting said additional strain gauge and said first input terminal of said sensing means.

2. A combination as in claim 1 wherein said output sensing means comprises a high input impedance difference amplifier.

3. A combination as in claim 2 further comprising a variable gain amplifier connected to said difference amplifier.

References Cited

UNITED STATES PATENTS

| | | | |
|---|---|---|---|
| 2,980,852 | 4/1961 | Mell | 73—88.5 XR |
| 3,273,396 | 9/1966 | Beck | 73—362 |
| 3,358,257 | 12/1967 | Painter et al. | 73—141 XR |

CHARLES A. RUEHL, Primary Examiner

U.S. Cl. X.R.

73—141

PO-1050
(5/69)

UNITED STATES PATENT OFFICE
CERTIFICATE OF CORRECTION

Patent No. 3,541,844                    Dated November 24, 1970

Inventor(s)      Jordan H. Stover, III

It is certified that error appears in the above-identified patent and that said Letters Patent are hereby corrected as shown below:

Col. 6, lines 9 and 10, after "two", delete "additional stra: guage and", and insert --terminals, and fourth and--.

Signed and sealed this 23rd day of March 1971.

(SEAL)
Attest:

EDWARD M. FLETCHER, JR.                WILLIAM E. SCHUYLER, JR.
Attesting Officer                       Commissioner of Patents